Aug. 1, 1933.  F. E. NORTON  1,920,478
HOOK AND BAIT HOLDER
Filed April 11, 1932
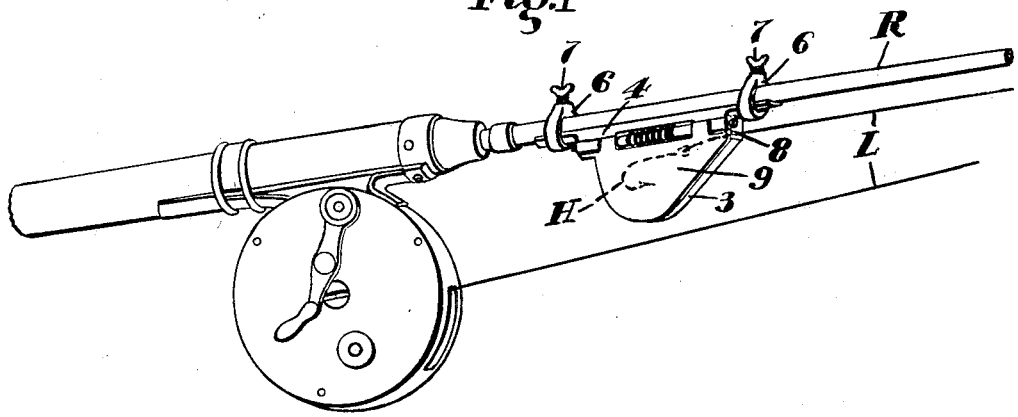
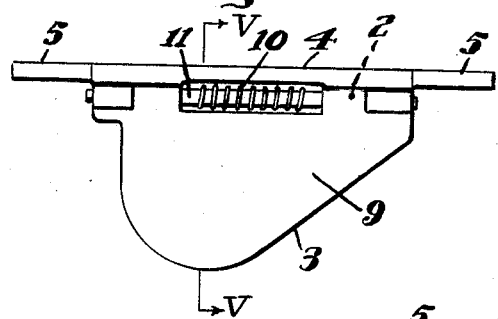
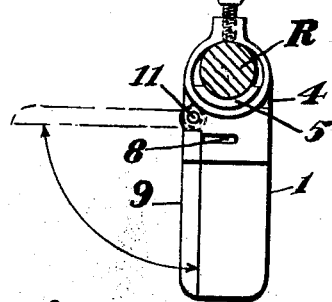
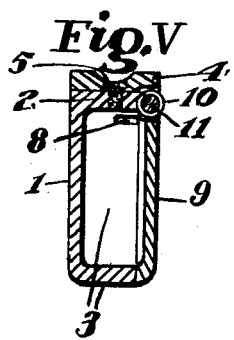
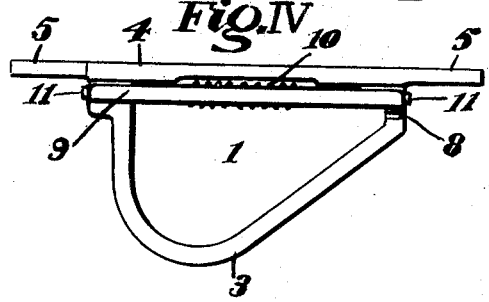
Inventor
Fred E. Norton
By Attorney Patented Aug. 1, 1933

1,920,478

UNITED STATES PATENT OFFICE 1,920,478

HOOK AND BAIT HOLDER

Fred E. Norton, Kennebunk, Me.

Application April 11, 1932. Serial No. 604,567

4 Claims. (Cl. 43—33)

This invention relates to angling equipment and particularly to a hook and a bait holder adapted to protect the hook and bait especially while being carried through bushes and like obstructions. Such devices have been proposed but my present invention contemplates certain improvements which are of great advantage in actual fishing practice and which not only increases the angler's opportunity of success, but relieves him from various annoyances which tend to detract from the pleasure of the sport.

As has been commonly experienced by anglers, particularly those accustomed to fish brooks and small streams surrounded by woods or bushes where success depends so much on ability to penetrate the most inaccessible places, one of the most annoying difficulties arises from the accidental catching of the hook in some obstruction. The result is loss of time and frequently failure through such an approach to make a successful catch which otherwise would have been assured. The damage to the hook, the line and usually the multilation of the bait are prevented by my invention as will appear from the following specification and from which it will appear that not only would the hook and bait be protected against deterioration or mutilation as by accidental snagging, but the device itself is so constructed and arranged that it does not tend to catch as has been the case with most of the proposed devices. I effect this by the construction and arrangement of my holder and the mounting of it on the rod as shown in the accompanying drawing.

In the drawing:

Fig. I is a fragmentary perspective view of a conventional fishing rod equipped with my invention.

Fig. II is a vertical cross section through the casing indicating in full and dotted lines the closed and open positions, respectively of the casing cover.

Fig. III is a side elevation of the casing removed and as seen from the right in Fig. I.

Fig. IV is a similar view as seen from the reverse side, and

Fig. V is a section on the line V—V of Fig. III.

My holder consists of a casing having a flat side 1 and a surrounding flange consisting of a straight portion 2 along one edge and a curved or rounded portion 3 connecting therewith. The portion 2 is formed with a bearing or seat 4 adapted to fit against the side of the rod R. It is provided at its ends with clamping projections 5 over which clamping rings 6 are slipped. These may be held by screws 7 or other suitable devices. The flanges 2 and 3 at the forward end come to a somewhat sharper juncture than at the rear end which is smoothly rounded. This forward end is slotted as at 8 to receive a line as indicated at L. The hook H and the bait lies within the holder and is retained in place by a cover 9 normally held closed by a coil spring 10 which is lodged around the pintle 11 of the cover hinge and so disposed as to protect it against catching or snagging.

The casing holds the hook and bait and as the line L can be reeled up to draw it tight, prevents the line also from catching. When ready for use the cover 9 is lifted by the finger and the hook and bait lifted out at the same time clearing the line from the notch 8.

My containers may be made of any desired material, but preferably of light and rigid construction so as not to interfere with the balance of the rod. While the design may be somewhat varied the form shown has great advantage in being free from tendencies to catch and also as being well adapted to hold the usual hook and bait with reasonable snugness but without jamming or mutilating the bait.

What I therefore claim and desire to secure by Letters Patent is:—

1. A protective holder for a baited fish hook or like angling lure attached to a line, comprising a flat casing open on one face and having one straight side wall and an opposite continuously curved side wall defining its enclosure, a rod bearing along the straight side wall, means for clamping said bearing to a rod, a cover hinged to the straight side of the casing, a spiral spring protectively disposed in the cover hinge and normally closing said cover, said curved side wall meeting said straight side wall in a forward taper and having a line receiving notch at the juncture therewith and closed to said cover.

2. A protective holder for a baited fish hook or like angling lure attached to a line, comprising a flat casing open on one face and having one straight side wall and an opposite continuously curved side wall defining its enclosure, said casing having a rod bearing along the straight side wall, means for clamping said bearing to a rod, a cover for the open side of the holder hinged to the straight side of the casing, means normally closing said cover, said curved side wall meeting said straight side wall in a forward taper and having a line receiving notch at the juncture therewith and closed to said cover.

3. A protective holder for a baited fish hook or like angling lure attached to a line, comprising a flat casing open on one face and having one straight side wall and an opposite continuously curved side wall defining its enclosure, a rod bearing along the straight side wall, means clamping said bearing to the rod, a cover hinged to the straight side of the casing, resilient means normally closing said cover, said curved side wall meeting said straight side wall in a forward taper and having a line receiving notch at the juncture therewith and closed to said cover, and acting as a stop for the line juncture with the hooked lure, whereby it may be held by the tautened line with its hook end free.

4. A protective holder for a baited fish hook or like angling lure comprising a flat face longitudinally tapered casing open on one face, means for clamping it longitudinally of a rod, said casing having a narrow line receiving notch at the apex of its tapered end, and adapted to act as a stop for the end of the hook shank, a cover pivoted laterally of the open side and a spring yieldingly holding said cover normally closed on said open side and notch.

FRED E. NORTON.